United States Patent [19]

Well

[11] Patent Number: 5,905,107
[45] Date of Patent: May 18, 1999

[54] UNVULCANIZED RUBBER MIXTURE FOR TIRE TREADS

[75] Inventor: Michael Well, Vechelde, Germany

[73] Assignee: Continental Aktiengesellschaft, Hannover, Germany

[21] Appl. No.: 09/018,426

[22] Filed: Feb. 6, 1998

[30] Foreign Application Priority Data

Feb. 6, 1997 [DE] Germany .......................... 197 04 464

[51] Int. Cl.$^6$ ..................................... C08K 3/00
[52] U.S. Cl. ..................... 524/492; 524/495; 525/332.6
[58] Field of Search ..................... 525/332.6; 524/495, 524/492

[56] References Cited

U.S. PATENT DOCUMENTS

| | | | |
|---|---|---|---|
| 4,334,044 | 6/1982 | Kotani et al. ........................... | 525/377 |
| 4,348,311 | 9/1982 | Machurat et al. ....................... | 524/530 |
| 4,835,209 | 5/1989 | Kitagawa et al. ....................... | 524/507 |
| 5,326,828 | 7/1994 | Rowland et al. ........................ | 525/346 |
| 5,340,867 | 8/1994 | Yagawa et al. .......................... | 524/80 |
| 5,508,338 | 4/1996 | Takeichi et al. ........................ | 524/496 |
| 5,580,919 | 12/1996 | Agostini et al. ........................ | 524/430 |
| 5,684,091 | 11/1997 | Maly et al. ............................ | 525/332.5 |

FOREIGN PATENT DOCUMENTS

| | | |
|---|---|---|
| 0751178 | 1/1997 | European Pat. Off. . |
| 95/34601 | 12/1995 | WIPO . |

OTHER PUBLICATIONS

Copy of an European Search Report issued in connection with European Application No. 98 10 1609.

Debnath et al., "Studies on the Effect of Thiuram Disulfide on NR Vulcanization Accelerated by Thiazole–Based Accelerator Systems", *Journal of Applied Polymer Science,* vol. 60, pp. 845–855 (1996).

*Primary Examiner*—Edward J. Cain
*Attorney, Agent, or Firm*—Greenblum & Bernstein P.L.C.

[57] ABSTRACT

Unvulcanized rubber mixture that can be cross linked with sulfur, including: (A) 100 weight parts of total mass of unvulcanized rubber including: about 40 to 100 weight parts of styrene-butadiene-copolymer (S-SBR) that is produced in solution; and (B) relative to the 100 weight parts of total mass of unvulcanized rubber: about 50 to 80 pphr silicic acid, about 3 to 7 pphr silanization agent, about 0.1 to 0.5 pphr tetrabenzylthiuramdisulfide (TBzTD), and about 1 to 3 pphr benzothiazyl-2-cyclohexylsulfenamide (CBS). A vulcanization process, including vulcanizing the unvulcanized rubber mixture. A tire including a tread that is produced from the unvulcanized rubber mixture.

20 Claims, No Drawings

UNVULCANIZED RUBBER MIXTURE FOR TIRE TREADS

CROSS-REFERENCE OF RELATED APPLICATION

The present invention claims the priority under 35 U.S.C. § 119 of German Patent Application No. 197 04 464.6 filed on Feb. 6, 1997, the disclosure of which is expressly incorporated by reference herein in its entirety.

BACKGROUND OF THE INVENTION

1. Field of the Invention

The invention relates to an unvulcanized rubber mixture, in particular for tire treads, that can be cross linked with sulfur.

2. Discussion of Background

Since the road handling of a tire depends to a great extent on the unvulcanized rubber composition of the tread, particularly high demands are put on the composition of the tread mixture. It could, for example, be determined that by varying the fillers, the characteristics of the tire such as wear, road drag, and wet traction could be influenced. But the effectiveness of these fillers depends upon which other components (further additives such as catalysts, softeners, anti-aging agents) are mixed into the unvulcanized rubber mixture for treads. For example, tread mixtures are known that contain an active filler that consists for the most part of silicic acid. These tread mixtures containing silicic acid give the tire low road drag and good wet traction. The unvulcanized rubber components of these silicic-acid-containing mixtures are vulcanized by sulfur and a suitable cross-linking system. An example of a suitable cross-linking system is vulcanization catalyst benzothiazyl-2-cyclohexylsulfenamide (CBS) and diphenylguanidine (DPG). But it has been observed that unvulcanized rubber mixtures of this kind give the vulcanized tread a low tensile strength and a low ultimate elongation so that these tires exhibit only limited wear resistance.

SUMMARY OF THE INVENTION

An object of the present invention is to provide an unvulcanized rubber mixture, especially for tire treads, that demonstrates greater tensile strength and a greater ultimate elongation, so that the wear resistance of vulcanized tires is improved.

This object is solved in accordance with the invention, wherein the unvulcanized rubber mixture comprises:
- (A) 100 weight parts of total mass of unvulcanized rubber comprising:
    about 40 to 100 weight parts of styrene-butadiene-copolymer (S-SBR) that is produced in solution; and
- (B) relative to the 100 weight parts of total mass of unvulcanized rubber:
    about 50 to 80 pphr silicic acid,
    about 3 to 7 pphr silanization agent,
    about 0.1 to 0.5 pphr tetrabenzylthiuramdisulfide (TBzTD), and
    about 1 to 3 pphr benzothiazyl-2-cyclohexylsulfenamide (CBS).

The unvulcanized rubber mixtures in accordance with the invention give the vulcanized material an exceptional tensile strength and ultimate elongation, and consequently a high energy at break. This combination in accordance with the invention makes it possible to increase the ability to absorb mechanical stress, especially of tire treads with the same, low road drag and good wet traction. Surprisingly, it has also been observed that an optimal flow/heating time ratio prevails during vulcanization of this unvulcanized rubber mixture. These characteristics during vulcanization are significant for the process. In this manner, the pre-vulcanization time of the mixture can be increased, which results in an improvement of process reliability. At the same time, however, the total vulcanization period can be shortened, so that energy and time are saved during the manufacture of the vulcanizate. By shortening the vulcanization period of the unvulcanized rubber mixture of the tire treads, overheating of other constituents that require less time for vulcanization is also avoided. In doing so, the mechanical stability of the entire tire is improved.

In accordance with one aspect, the present invention involves an unvulcanized rubber mixture that can be cross linked with sulfur, comprising: (A) 100 weight parts of total mass of unvulcanized rubber comprising: about 40 to 100 weight parts of styrene-butadiene-copolymer (S-SBR) that is produced in solution; and (B) relative to the 100 weight parts of total mass of unvulcanized rubber: about 50 to 80 pphr silicic acid, about 3 to 7 pphr silanization agent, about 0.1 to 0.5 pphr tetrabenzylthiuramdisulfide (TBzTD), and about 1 to 3 pphr benzothiazyl-2-cyclohexylsulfenamide (CBS).

In accordance with a feature of the invention, the total mass of unvulcanized rubber comprises up to about 50 weight parts of at least one of natural, unvulcanized rubber (NR) and synthetic polyisoprene (IR). The total mass of unvulcanized rubber may comprise up to about 45 weight parts of polybutadiene (BR).

In accordance with another aspect, the unvulcanized rubber mixture further comprises up to about 20 pphr carbon black. Preferably, the unvulcanized rubber mixture comprises about 10 to 20 pphr carbon black.

In accordance with another feature, the unvulcanized rubber mixture further comprises anti-aging agent. The anti-aging agent may be 6 PPD (N-phenyl-N'-(1,3-dimethylbutyl)-p-phenylenediamine), and/or DTPD (N,N'-ditoluyl-p-phenylenediamine).

In accordance with another feature, the unvulcanized rubber mixture further comprises processing aid. The processing aid may be at least one member selected from the group consisting of stearic acid, wax, fat, and dispergator.

In accordance with another aspect, the unvulcanized rubber mixture comprises about 0.15 to 0.25 pphr TBzTD. The unvulcanized rubber mixture may comprise about 1.5 to 2.5 pphr CBS Further, the unvulcanized rubber mixture may comprise about 0.15 to 0.25 pphr TBzTD and about 1.5 to 2.5 pphr CBS.

In accordance with yet another feature, the total mass of unvulcanized rubber comprises about 45 to 75 weight parts S-SBR. The total mass of unvulcanized rubber may comprise about 20 to 40 weight parts of polybutadiene In accordance with another feature, the unvulcanized rubber mixture further comprises about 5 to 20 pphr softener as an additive. The softener may be at least one member selected from the group consisting of aromatic oil and napthenic oil.

In accordance with one aspect, the present invention involves a vulcanization process, comprising vulcanizing an unvulcanized rubber mixture comprising: (A) 100 weight parts of total mass of unvulcanized rubber comprising: about 40 to 100 weight parts of styrene-butadiene-copolymer (S-SBR) that is produced in solution; and (B) relative to the 100 weight parts of total mass of unvulcanized rubber: about 50 to 80 pphr silicic acid, about 3 to 7 pphr silanization agent, about 0.1 to 0.5 pphr tetrabenzylthiuramdisulfide (TBzTD), and about 1 to 3 pphr benzothiazyl-2-cyclohexylsulfenamide (CBS).

In accordance with one feature, the vulcanization process comprises use of sulfur.

In accordance with another feature, the vulcanization process comprises use of sulfur dispenser.

In accordance with another aspect, the present invention comprises a tire, comprising a tread that is produced from an unvulcanized rubber mixture, comprising:

(A) 100 weight parts of total mass of unvulcanized rubber comprising: about 40 to 100 weight parts of styrene-butadiene-copolymer (S-SBR) that is produced in solution; and (B) relative to the 100 weight parts of total mass of unvulcanized rubber: about 50 to 80 pphr silicic acid, about 3 to 7 pphr silanization agent, about 0.1 to 0.5 pphr tetrabenzylthiuramdisulfide (TBzTD), and about 1 to 3 pphr benzothiazyl-2-cyclohexylsulfenamide (CBS).

DETAILED DESCRIPTION

The particulars shown herein are by way of example and for purposes of illustrative discussion of the preferred embodiments of the present invention only and are presented in the cause of providing what is believed to be the most useful and readily understood description of the principles and conceptual aspects of the invention. In this regard, no attempt is made to show details of the invention in more detail than is necessary for a fundamental understanding of the invention, the description making apparent to those skilled in the art how the several forms of the invention may be embodied in practice.

All percent measurements in this application, unless otherwise stated, are measured by weight based upon 100% of a given sample weight. Thus, for example, 30% represents 30 weight parts out of every 100 weight parts of the sample.

Unless otherwise stated, a reference to a compound or component includes the compound or component by itself, as well as in combination with other compounds and components, such as mixtures of compounds.

The unvulcanized rubber mixture of the present invention includes styrene-butadiene-copolymer that is produced in solution (S-SBR). The manufacture of this styrene-butadiene type proceeds with the usage of lithium alkyls, for example. The portion of styrene in this polymer amounts to approximately 15 to 35 mol %. The cis 1,4-portion of the polybutadiene should have a value of about 90 to 99 mol % with the 1,2-portion up to about 5 mol %. According to the invention, the S-SBR-portion in the unvulcanized rubber mixture preferably amounts to about 0 to 100 weight parts, preferably about 45 to 75 weight parts, so that the vulcanized tire obtains optimal characteristics, with respect to, for example, road drag and wet traction.

Further, the unvulcanized rubber mixture contains about 0 to 45 weight parts, preferably about 20 to 40 weight parts, polybutadiene. The cis 1,4-portion of polybutadiene should amount to about >90 mol %. Such high cis-portions are, for example, attained through solution polymerization in the presence of catalysts of the rare earth elements such as neodymium (Nd). Furthermore, the unvulcanized rubber mixture in accordance with the invention contains about 0 to 50 weight parts natural, unvulcanized rubber and/or synthetic polyisoprene, wherein the 1,4-portion should measure about >90 mol %. A synthetic polvisoprene of this kind can be obtained via the stereo-specific polymerization in solution with the aid of a Ziegler-Natta-catalyst, e.g., $TiCl_4$/Al (alkyl)$_3$, or by using finely dispersed lithium alkyls, e.g., n-butylithium. For the unvulcanized rubber mixture in accordance with the invention, it is preferable to use unvulcanized natural rubber. The cis 1,4-polyisoprene-portion in unvulcanized natural rubber amounts to about >99 mol %.

The silicic acid that is used in the unvulcanized rubber mixture in accordance with the invention is known. Silicic acid with a BET-surface of about 145 to 270 $m^2$/g (ASTM D 5604), a CTAB number of about 120 to 285 $m^2$/g (ASTM D 3765), and a porosity of about 0.7 to 1.7 ml/g (DIN 66133) should be used. "VN3" (trade name of Degussa AG, Frankfiurt/Main, Germany), for example, can be used as the silicic acid. To attain the desired characteristics of the unvulcanized rubber mixture or the vulcanizate, about 50 to 80 pphr silicic acid should be used. To bond the silicic acid to the polymer system, silanization agents are used, such as bis-3-(triethoxysilylpropyl)tetrasulfide (TESPT) for example, which are deposited on a carrier material (carbon black). Thus, for bonding the silicic acid to the polymer, a silane (silanizing means) is added to the unvulcanized rubber mixture. The silane contains at least two end groups, one to enter a good bond to the polymer and the second for bonding to the silicic acid. In principle, other suitable linkages, such as disulfide, can also be used.

It is advantageous to use carbon black in a concentration of up to about 20 pphr as another active filler material (carbon black which serves as a base material for the silanization agent. is, in accordance with the invention, not counted as a filler material). In principle, one can do without this filler material, but particular advantages arise if about 10 to 20 pphr of filler material are included in the unvulcanized rubber mixture. This amount of carbon black improves the shrinkage behavior of the unvulcanized tread, so that processing is optimized. Moreover, the conductivity in the vulcanized material is increased so that the problems caused by the great electrical resistance of mixtures only reinforced by silicic acid can be reduced. The carbon blacks should have the following characteristics: DBP-number (ASTM D 2414) of about 90 to 200 $cm^3$/100 g and a CTAB-number (ASTM D 3765) of about 80 to 170 $m^2$/g.

The unvulcanized rubber mixture for tire treads in accordance with the invention further includes about 0.1 to 0.5 pphr tetrabenzylthiuramdisulfide (TBzTD) and about 1 to 3 pphr benzothiazyl-2-cyclohexylsulfenamide (CBS). In particular, the combination of about 0.15 to 0.25 pphr TBzTD and about 1.5 to 2.5 pphr CBS leads to optimal characteristics during vulcanization, so that the processing reliability of the unvulcanized rubber mixture is ensured. In comparison to diphenylguanidine (DPG), the usage of tetrabenzylthiuramdisulfide (TBzTD) has the advantage that no toxic substances are released during vulcanization.

Further, the unvulcanized rubber mixture in accordance with the invention should preferably exhibit about 5 to 20 pphr softener. This concentration of softener positively influences the hardness of the vulcanized tread, so that the characteristics of ultimate elongation and tensile strength can be further improved. Conventional substances such as aromatic or napthenic oils, for example, can be used as softeners.

Still further, the unvulcanized rubber mixture for treads in accordance with the invention should contain conventional additives, such as anti-aging agents and processing aids. Examples of anti-aging agents (ASM) include 6 PPD: N-phenyl-N'-(1,3-dimethylbutyl)-p-phenylenediamine; and DTPD: N,N'-ditoluyl-p-phenylenediamine. Examples of processing aids include stearic acids, waxes, fats, and dispergators (i.e., peptizing agents). Sulfur or sulfur dispensers, e.g., DTM-dimorpholyldisulfide, are used for the vulcanization.

The present invention will be further illustrated by way of the following Examples in the table set forth below. Comparison Examples 1 and 2 are for comparison purposes and Examples 1 and 2 are in accordance with the present invention. These examples are non-limiting and do not restrict the scope of the invention.

Unless stated otherwise, all percentages, parts, etc. presented in the examples are by weight.

| Unvulcanized rubber mixture [weight parts for rubbers and pphr for other components] | | | | |
|---|---|---|---|---|
| Component | Comp. Ex. 1 | Comp. Ex. 2 | Example 1 | Example 2 |
| unvulcanized natural rubber (NR) | 10 | 10 | 10 | 10 |
| S-SBR ("Buna VSL 1940S20") | 34.4 | — | 34.4 | — |
| S-SBR ("Buna VSL 1950S25") | 41.3 | 78.4 | 41.3 | 78.4 |
| Polybutadiene (BR) | 35 | 33 | 35 | 33 |
| Carbon black N 121 | 10 | 17.5 | 10 | — |
| Carbon black N 339 | — | — | — | 17.5 |
| Silicic acid ("VN 3") | 70 | 70 | 70 | 70 |
| Mineral oil, aromatic | 13 | 13 | 13 | 13 |
| "Activator X50S" | — | 12.5 | 9 | 9 |
| TESPT ("Si 69") | 6.5 | — | — | — |
| CaO | — | — | 3 | 3 |
| ASM DTPD | 1 | 0.6 | 0.6 | 0.6 |
| ASM 6 PPD | 1 | 1.4 | 1.4 | 1.4 |
| ZnO | 2.5 | 2 | 2.5 | 2 |
| Stearic acid | 1 | 1 | 1 | 1 |
| Sulfur | 1.5 | 2 | 1.5 | 2 |
| CBS | 2 | 2 | 2 | 2 |
| DPG | 2 | 1.5 | — | — |
| TBzTD | — | — | 0.15 | 0.15 |
| Characteristics | | | | |
| $F_{max}-F_{min}$ [dNm] | 18.77 | 21.67 | 17.02 | 23.16 |
| $F_{max}$ [dNm] | 22.02 | 26.0 | 22.7 | 28.82 |
| $F_{min}$ [dNm] | 3.25 | 4.33 | 5.68 | 5.66 |
| $T_5$ [min] | 1.4 | 0.8 | 5 | 0.9 |
| $T_{95}$ [min] | 26 | 8 | 22.6 | 6.5 |
| Tensile strength [Mpa] | 15 | 14.1 | 16.7 | 14 |
| Ultimate elongation [%] | 500 | 368 | 577 | 412 |
| Module 300% | 8.63 | 12.21 | 7.8 | 10.67 |
| Shore hardness A | 64 | 70 | 62 | 70 |
| Rebound resilience [%] | 33 | 28 | 33 | 29 |
| Energy at break [J/cm$^3$] | 30.6 | 22 | 38.57 | 24.5 |

Referring to the above table, "Buna VSL 1940S20" and "Buna VSL 1950S25" are available from Bayer AG, Leverlcusen, Germany. Carbon black N 121 and carbon black N 339 are classifications in accordance with ASTM-D 1765. "Activator X50S" and "Si 69" are trade names of Degussa AG, Frankfurt, Germany. Further, module 300% is measured in accordance with DIN 53504.

The table shows that conventional unvulcanized rubber mixtures for tire treads (Comparison Examples 1 and 2) give the vulcanized material a lower mechanical strength. This can be seen by comparing the values of the tensile strength, ultimate elongation, and the energy at break resulting therefrom with those of Examples 1 and 2 in accordance with the invention. The life span of the vulcanizate (vulcanized tire treads) can thereby be extended. The table also demonstrates that the pre-vulcanization time (T5) can be increased in accordance with the invention. That means the processing reliability can be increased. At the same time, the value T95 (required time to attain vulcanization level 95%) of Examples 1 and 2 in accordance with the invention, when compared with Comparison Examples 1 and 2, can be decreased. Thus, the vulcanization time can be decreased to achieve time and energy-savings.

The unvulcanized rubber mixtures in accordance with the invention can be used for the manufacturing of tire treads, in particular for passenger car tires. These tires should involve a construction known from the prior art. Winter as well as summer tires can be outfitted with this tire tread mixture. Tires can thus be made available, whose running tread is constructed from an unvulcanized rubber mixture that is reinforced by silicic acid, having a low road drag, good wet traction, and at the same time, in accordance with the invention exhibit a longer life span due to increased tensile strength and ultimate elongation, as well as an optimal vulcanization treatment.

It is noted that the foregoing examples have been provided merely for the purpose of explanation and are in no way to be construed as limiting of the present invention. While the invention has been described with reference to preferred embodiments, it is understood that the words which have been used herein are words of description and illustration, rather than words of limitation. Changes may be made, within the purview of the appended claims, as presently stated and as amended, without departing from the scope and the spirit of the invention in its aspects. Although the invention has been described herein with reference to particular means, materials and embodiments, the invention is not intended to be limited to the particulars disclosed herein; rather, the invention extends to all functionally equivalent structures, methods and uses, such as are within the scope of the appended claims.

What is claimed:

1. An unvulcanized rubber mixture that can be cross linked with sulfur, comprising:
    100 weight parts of total mass of unvulcanized rubber comprising:
        about 40 to 100 weight parts of styrene-butadiene-copolymer (S-SBR) that is produced in solution; and
    relative to the 100 weight parts of total mass of unvulcanized rubber:
        about 50 to 80 pphr silicic acid,
        about 3 to 7 pphr silanization agent,
        about 0.1 to 0.5 pphr tetrabenzylthiuramdisulfide (TBzTD), and
        about 1 to 3 pphr benzothliazyl-2-cyclohexylsulfenamide (CBS).

2. The unvulcanized rubber mixture of claim 1, wherein the total mass of unvulcanized rubber comprises up to about 50 weight parts of at least one of natural, unvulcanized rubber (NR) and synthetic polyisoprene (IR).

3. The unvulcanized rubber mixture of claim 1, wherein the total mass of unvulcanized rubber comprises up to about 45 weight parts of polybutadiene (BR).

4. The unvulcanized rubber mixture of claim 1, further comprising up to about 20 pphr carbon black.

5. The unvulcanized rubber mixture of claim 4, wherein the mixture comprises about 10 to 20 pphr carbon black.

6. The unvulcanized rubber mixture of claim 1, further comprising anti-aging agent.

7. The unvulcanized rubber mixture of claim 6, wherein the anti-aging agent comprises 6 PPD (N-phenyl-N'-(1,3-dimethylbutyl)-p-phenylenediarnine).

8. The unvulcanized rubber mixture of claim 6, wherein the anti-aging agent comprises DTPD (N,N'-ditoluyl-p-phenylenediamine).

9. The unvulcanized rubber mixture of claim 1, further comprising processing aid.

10. The unvulcanized rubber mixture of claim 9, wherein the processing aid is at least one member selected from the group consisting of stearic acid, wax, fat, and dispergator.

11. The unvulcanized rubber mixture of claim 1, wherein the mixture comprises about 0.15 to 0.25 pphr TBzTD.

12. The unvulcanized rubber mixture of claim 1, wherein the mixture comprises about 1.5 to 2.5 pphr CBS.

13. The unvulcanized rubber mixture of claim 1, wherein the total mass of unvulcanized rubber comprises about 45 to 75 weight parts S-SBR.

14. The unvulcanized rubber mixture of claim 1, further comprising about 5 to 20 pphr softener as an additive.

15. The unvulcanized rubber mixture of claim 14, wherein the softener is at least one member selected from the group consisting of aromatic oil and napthenic oil.

16. The unvulcanized rubber mixture of claim 1, wherein the mixture comprises about 20 to 40 pphr polybutadiene.

17. A vulcanization process, comprising vulcanizing an unvulcanized rubber mixture comprising:
   100 weight parts of total mass of unvulcanized rubber comprising:
      about 40 to 100 weight parts of styrene-butadiene-copolymer (S-SBR) that is produced in solution; and
   relative to the 100 weight parts of total mass of unvulcanized rubber:
      about 50 to 80 pphr silicic acid,
      about 3 to 7 pphr silanization agent,
      about 0.1 to 0.5 pphr tetrabenzylthiuramdisulfide (TBzTD), and
      about 1 to 3 pphr benzothiazyl-2-cyclohexylsulfenamide (CBS).

18. The vulcanization process of claim 17, wherein the vulcanization comprises use of sulfur.

19. The vulcanization process of claim 17, wherein the vulcanization comprises use of sulfur dispenser.

20. A tire, comprising a tread that is produced from an unvulcanized rubber mixture, comprising:
   100 weight parts of total mass of unvulcanized rubber comprising:
      about 40 to 100 weight parts of styrene-butadiene-copolymer (S-SBR) that is produced in solution; and
   relative to the 100 weight parts of total mass of unvulcanized rubber:
      about 50 to 80 pphr silicic acid,
      about 3 to 7 pphr silanization agent,
      about 0.1 to 0.5 pphr tetrabenzylthiuramdisulfide (TBzTD), and
      about 1 to 3 pphr benzothiazyl-2-cyclohexylsulfenamide (CBS).

* * * * *